UNITED STATES PATENT OFFICE.

CARL LUDWIG SCHLEICH, OF BERLIN, GERMANY.

PREPARATION OF CHLOROFORM IN A SOLID CONDITION.

No. 925,658.  Specification of Letters Patent.  Patented June 22, 1909.

Application filed March 26, 1909. Serial No. 486,020.

*To all whom it may concern:*

Be it known that I, CARL LUDWIG SCHLEICH, a citizen of the German Empire, and resident of 8, 9 Passauerstrasse, Berlin, Germany, physician, medicinæ doctor, professor, have invented certain new and useful Improvements in a Preparation of Chloroform in a Solid Condition and a Process for Manufacturing It, of which the following is a specification.

Heretofore chloroform has been restricted in its use for the reason that the same has only been prepared in a liquid and gaseous state. These limits would be considerably larger if the manufacturing of chloroform in a solid condition, for instance in the form of a powder, tablets or the like, had already succeeded.

This invention is to fill out this gap and refers to a preparation of chloroform in a solid condition. For this purpose the chloroform is fixed to such substances as are indifferent toward chloroform and do not only solidify it, but also prevent it from evaporation, deprive it of its caustic effect, preserve its bactericidal, hyperæmizing and analgetic qualities and assimilate the animal body.

As chloroform is decomposed by light it is preferable to employ for its solidification such a substance as beside the qualities before mentioned render chloroform within the mixture insensible to light in order to be independent from a light protecting package. A substance which answers to these requirements is peptone, which above other albuminous substances has the advantage that it absorbs the largest quantities of chloroform.

The best preparation is carried out by perfectly saturating peptone with chloroform. The physical behavior of chloroform is made use of for obtaining that condition by applying an excess of chloroform, which evaporates after the saturation of the substance has been reached. The process is carried out in this manner that peptone is mixed with water and stirred up till a viscous paste remains; then chloroform in excess is added and the whole mixture stirred up again. After some time chloroform has been fully absorbed by peptone which no more gives off any chloroform. The excess of chloroform then evaporates and may be collected in any manner, condensed and used again.

Example: 100 grams peptone are mixed with 100 grams of chloroform and 90 grams of water; they yield 118 grams of finished preparation. The mixture is undecomposable by bacteria, chemically undestroyable without special reagents; by the protecting envelop chloroform is deprived of its caustic character without decreasing its other qualities. The chloroform solidified by the manner described can be freed by acids, alkalines etc. whereupon its sterilizing effect on the intestines is based.

What I claim is:

1. A solid chloroform-containing compound comprising a solid peptone having chloroform incorporated with it.

2. The process of making a solid medical preparation containing chloroform consisting in mixing fluid chloroform in excess with peptone and allowing the excess of chloroform to evaporate.

In testimony whereof I have signed this specification in the presence of two subscribing witnesses.

CARL LUDWIG SCHLEICH.

Witnesses:
 HENRY HASPER,
 WOLDEMAR HAUPT.